Sept. 26, 1933.  W. W. RIEDEL  1,928,231
SHOCK ABSORBER
Filed Jan. 7, 1932
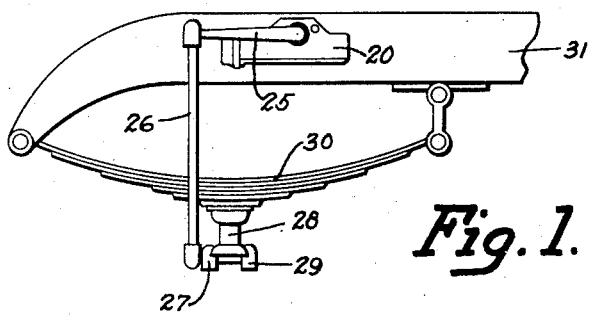
Fig. 1.
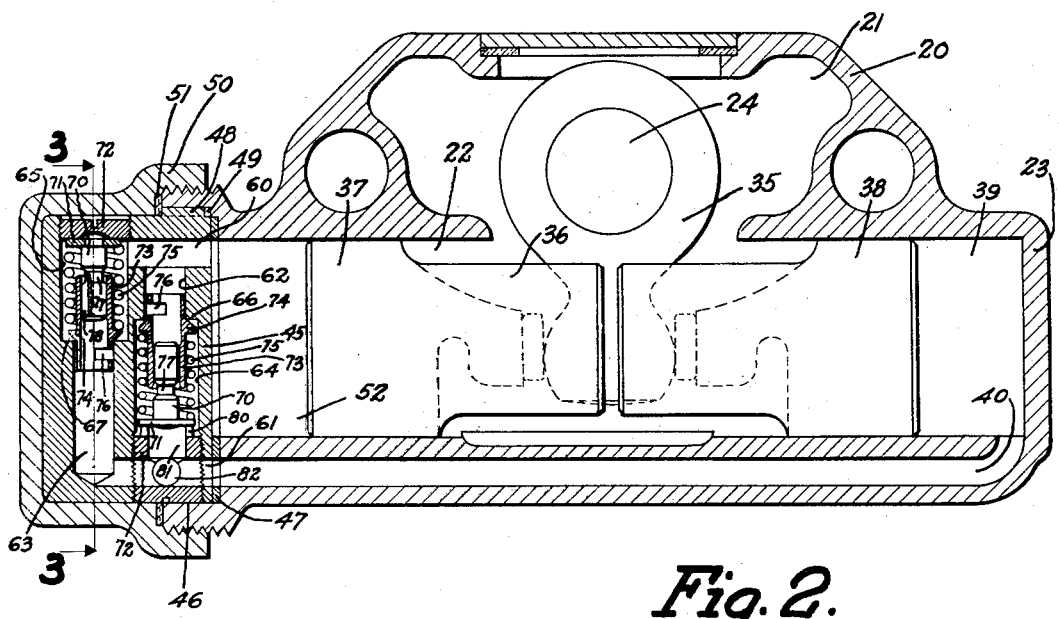
Fig. 2.
Fig. 3.

Patented Sept. 26, 1933

1,928,231

UNITED STATES PATENT OFFICE 1,928,231

SHOCK ABSORBER

Walter W. Riedel, Dayton, Ohio, assignor to Delco Products Corporation, Dayton, Ohio, a corporation of Delaware Application January 7, 1932. Serial No. 585,274

6 Claims. (Cl. 188—88)

This invention relates to improvements in hydraulic shock absorbers for motor vehicles and particularly to the fluid flow control devices for such shock absorbers.

It is among the objects of the present invention to provide a hydraulic shock absorber with a unitary fluid flow control mechanism which may completely be assembled and tested before being attached to the shock absorber.

Further objects and advantages of the present invention will be apparent from the following description, reference being had to the accompanying drawing wherein a preferred embodiment of one form of the present invention is clearly shown.

In the drawing:

Fig. 1 is a fragmentary side view of a vehicle chassis having a shock absorber embodying the present invention applied thereto. The road wheels of the chassis have been omitted for the sake of clearness.

Fig. 2 is a longitudinal sectional view taken through the casing of the shock absorber, certain parts being shown in elevation for the sake of clearness.

Fig. 3 is a transverse sectional view taken substantially along the line 3—3 of Fig. 2.

This invention provides a unitary valve mechanism for hydraulic shock absorbers which may be completely assembled and tested in any suitable fluid pressure machine before it is attached to the shock absorber with which it is to be used. This facilitates production of shock absorbers in that it is unnecessary completely to assemble a shock absorber before making it possible to thoroughly test the fluid flow control device therefor. Where the fluid flow control devices are assembled in the shock absorber and then tested, irregularities in the operation of the fluid flow control devices necessitate a disassembling of the shock absorber. However, in the present device the valve mechanism may readily be clamped upon a fluid pressure testing machine, and if said device does not function properly it may be removed from said machine, repaired and again tested before being finally assembled into the shock absorber with which it is to be used.

Referring to the drawing, the shock absorber is shown comprising a casing 20 providing a fluid reservoir 21 and a cylinder 22. In the present instance one end of the cylinder is shown closed by the integral end wall 23 of the casing, the other end of the cylinder being open.

Within the cylinder there is rotatably supported a rocker shaft 24, one end of which extends outside the casing and has the shock absorber operating arm 25 secured thereto. The free end of this arm is swivelly attached to one end of a link 26, the opposite end of said link being swivelly secured to a bracket 27 which is anchored to the axle 28 by the clamping member 29. Vehicle springs 30 on the axle 28 support the vehicle frame 31 to which is attached the shock absorber casing as shown in Fig. 1.

Within the shock absorber casing 20 a rocker arm 35 is attached to the rocker shaft 24, said arm extending into a space provided in the piston 36, which piston includes piston head portions 37 and 38. The piston head portion 38 forms the spring rebound control chamber 39 at the closed end of the cylinder. This spring rebound control chamber has a duct 40 leading from it through the casing, said duct terminating in the end of the casing adjacent the open end of the cylinder 22.

The unitary valve mechanism which is adapted to be attached to the casing for controlling the fluid circulation within said casing comprises a cylinder head block 45 which fits into a recess 46 in the open end of the cylinder portion of casing 20. A gasket 47 between the cylinder head block 45 and the casing provides a fluid tight seal. An extension 48 on the cylinder head block 45 fits into a slot 49 in the annular surface of recess 46, thus providing a locating lug so that the cylinder head block 45 may fit into the recess 46 in the proper position only. A cover cap 50 provides not only a receptacle for the cylinder head block 45, but it also provides the means for clamping said cylinder head block against the casing, as shown in Fig. 2. In order to insure a fluid tight seal so that fluid from the cylinder may not leak from the casing, another gasket 51 is provided between the cover cap 50 and the annular outer edge of the cylinder portion of the casing 20.

The space designated by the numeral 52 may be termed the spring compression control chamber, this chamber being provided within the cylinder between the piston head portion 37 and the cylinder head block 45.

The cylinder head block 45 comprising one element of the unitary valve mechanism, has two passages 60 and 61, the former opening into and communicating with the spring compression control chamber 52, the latter, numbered 61, aligning and communicating with the duct 40 as shown in Fig. 2. These two passages 60 and 61 are inter-connected by two ducts 62 and 63, each duct having an enlarged portion 64 and 65 respectively, forming shoulders 66 and 67 respectively, which provide sharp annular edges within the ducts, forming valve seats.

The fluid flow control device in each duct 62 and 63 comprises a valve pin 70 secured to a washer 71 which abuts against a plug 72 screw threaded into the outer end of the larger diameter portion 64 or 65 of the respective ducts 62 and 63. This valve pin slidably supports a tubular valve 73, one end of which extends into the smaller diameter portion of the respective ducts 62 and 63. To limit the entrance of this tubular valve into its respective duct and to provide a passage closing portion on the valve, an annular flange 74 is provided on each tubular valve, said flange extending outwardly and having a sloping surface which is urged upon the respective valve seat 66 or 67 by a spring 75 which is interposed between the flange 74 of the tubular valve and the washer or collar 71. The end of the tubular valve normally confined within the smaller diameter portion of its duct has a side opening 76 which, when the valve is moved from the valve seat, will establish a flow of fluid through the valve into the larger diameter portion of the respective duct. The valve pin of each valve has an annular groove 77 located between the end of the valve and the supporting washer or collar 71 thereof, this annular groove lying substantially adjacent the inner end of the tubular valve as shown in Fig. 2. The valve pin of the valve in the duct 63 has a longitudinal groove 78 extending from the outer end of the valve pin to the annular groove 77 thereof so as to establish a constant communication between the duct portions 63 and 65, said communication being established without movement of the annular valve 73 from its valve seat. The valve pin of the valve in duct 62, however, has no such longitudinal groove.

It may be seen in Fig. 2 that the plug 72 threaded into the outer end of the larger diameter portion 64 of duct 62 has an inwardly extending annular flange provided with cross slots 80, this extending flange providing a seat for the supporting collar or washer 71 of this valve, the slots 80 in said annular flange together with bore 81 in said plug providing communication with a cross bore 82 in the plug, which cross bore communicates with the passage 61 in the cylinder head block 45.

The fluid flow control devices function as follows:

When the vehicle springs 30 are moved upwardly toward the frame 31 in response to the striking of an obstruction by the road wheels of the vehicle, the link 26, connected to the axle 28 and the shock absorber operating arm 25, will rotate said arm clockwise, resulting in a similar rotation of the rocker shaft and lever 24 and 35 respectively. This moves the piston 36 toward the left as regards Fig. 2 and thus fluid within the spring compression control chamber 52 will be forced into the passage 60 of the unitary valve mechanism or cylinder head block 45. The fluid pressure exerted upon the valve in the duct portion 65 will urge said valve against its seat; however, fluid will flow through the longitudinal passage 78 in the valve pin 70 of the valve in duct 65, establishing a restricted flow of fluid into the duct portion 63 and thence through passage 61 in the block and cross passage 82 of the screw plug 72 into the duct 40 of the casing from where the fluid will flow into the spring rebound control chamber 39. Restriction of the fluid flow at the longitudinal passage 78 in pin 70 will resist the movement of the piston 36 toward the left and consequently the compression movement of the spring 30. If the fluid pressure within the chamber 52 may not properly be relieved by the restricted flow through the channel 78, then the fluid pressure exerted through duct 62 against valve 73 in this duct 62 will move said valve against the effect of its spring 75 so that its outwardly extending annular flange 74 is moved from the seat provided by the shoulder 66 in the duct 62, consequently there will be established a flow of fluid through the tubular valve 73 and its side opening 76 into the enlarged portion 64 of duct 62 from whence the fluid will flow through slots 80 in the annular flange of the screw plug through the bores 81 and 82 of said plug into the channel 61 of the cylinder head block thence through duct 40 into the spring rebound control chamber 39.

Upon the rebounding movement of the vehicle springs 30 the shock absorber will be operated in the opposite direction, that is, the piston will be moved toward the right as regards Fig. 2 and fluid will be forced from the spring rebound control chamber 39 through duct 40 thence through channel 61 including bore 82 of the screw plug 72 into the duct 63 thence through the longitudinal groove 78 in the pin 70 of the valve in duct 63 through the portion 65 of duct 63 and channel 60 into the spring compression control chamber 52. Excessive pressures being exerted through cylinder head block 61 into duct 63 against valve 73 in said duct will move said valve so that its flange 74 will be moved from the seat provided by the shoulder 67, thus a flow will be established through said valve 73 and its side opening 76 into the portion 65 of duct 63 thence through channel 60 into the spring compression control chamber 62.

Applicant has provided a unitary valve mechanism comprising a block having fluid passages which contain oppositely acting pressure release valves, which mechanism may be clamped in any suitable fluid pressure machine for testing purposes, thereby eliminating the necessity of completely assembling the shock absorber for purposes of testing it. It has been found that if, due to inaccuracies in manufacture or any other cause, the fluid flow control device assembled in a shock absorber will not function properly, then the entire shock absorber must be disassembled to permit inspection and repair of the faulty part. Applicant eliminates this extra labor by permitting the unitary valve mechanism to be separately assembled and clamped in a fluid pressure machine where the device may be properly tested. If it passes the test, then the assembled unitary valve mechanism may be placed in stock awaiting its final assembly into the proper shock absorber casing which may also previously be assembled, the attachment of the unitary valve mechanism to the shock absorber requiring only its application to the shock absorber and the screwing of the container or cover cap to the casing.

By this mechanism the production of hydraulic shock absorbers has been greatly facilitated and assembling and testing has been substantially reduced.

While the form of embodiment of the present invention as herein disclosed, constitutes a preferred form, it is to be understood that other forms might be adopted, all coming within the scope of the claims which follow.

What is claimed is as follows:

1. A shock absorber comprising, in combination, a casing providing a fluid reservoir and a cylinder having one open end; a cylinder head removably attached to the open end of the casing; a channelled block in said cylinder head, clamped by said head against the casing; oppositely acting pressure release valves in the channels of said block; a piston in the cylinder; and means providing communication between the pressure release valves and the cylinder chambers at the respective ends of the piston.

2. A shock absorber comprising, in combination, a casing providing a fluid reservoir and a cylinder; cylinder heads, at least one of which is removably secured to the casing; a piston in said cylinder forming two compression chambers therein; a valve-block contained in the removable cylinder head and clamped thereby against the casing, said block having valve chambers, means providing communication between the said valve chambers and the compression chambers; and oppositely acting pressure release valves in the valve-block chambers, for controlling the flow of fluid between the compression chambers.

3. A shock absorber comprising, in combination, a casing providing a fluid reservoir, a valve-block recess and a cylinder; a piston in said cylinder forming two compression chambers therein; a valve-block in the recess of the casing; a cover cap providing a housing for the valve-block and securing it properly sealed within the casing recess; two valve-chambers in the valve-block in communication with both compression chambers in the cylinders; a spring loaded valve in each valve-chamber for controlling the flow of fluid between the compression chambers therethrough, one valve operating oppositely from the other.

4. A shock absorber comprising, in combination, a casing providing a fluid reservoir and cylinder; a piston in said cylinder forming two compression chambers therein; a cover cap for one end of the cylinder; a valve block in said cover cap having two valve chambers each in communication with both compression chambers; and a pressure release in each valve chamber for controlling the flow of fluid between the compression chambers therethrough, said valves operating oppositely.

5. A shock absorber comprising, in combination, a casing providing a fluid reservoir and a cylinder one end of which is closed, the other open; a piston in said cylinder forming two compression chambers therein; a cylinder head block in the open end of the cylinder; a cover cap providing a container for the head block and securing said block to the casing; and fluid flow control devices in said head block, in communication with the compression chambers and adapted, in response to predetermined fluid pressures, to establish fluid flows between the said chambers in either direction.

6. A shock absorber comprising, in combination, a casing providing a fluid reservoir and a cylinder having one open end; a block attached to the casing and providing a plug for the open end of the cylinder said block having two recesses the respective ends of which are in communication with each other; a pressure release valve in each recess, one valve being adapted to be moved by fluid pressure in a direction opposite the other; a piston in the cylinder forming two compression chambers therein, one of which is in direct communication with the adjacent communicating ends of the recesses in the block; and a duct in the casing connecting the other compression chamber with the opposite ends of the two recesses in the block.

WALTER W. RIEDEL.